United States Patent
Nagai et al.

[11] Patent Number: 6,152,251
[45] Date of Patent: Nov. 28, 2000

[54] POWER ASSIST BICYCLE

[75] Inventors: Hisao Nagai; Kouhei Tomita; Shinobu Tsutsumikoshi, all of Hamamatsu; Kosaku Yamauchi, Shizuoka-Ken, all of Japan

[73] Assignee: Suzuki Kabushiki Kaisha, Hamamatsu, Japan

[21] Appl. No.: 09/175,450

[22] Filed: Oct. 20, 1998

[30] Foreign Application Priority Data

Oct. 22, 1997 [JP] Japan ................... P9-289746

[51] Int. Cl.⁷ ................... B62M 7/00
[52] U.S. Cl. ................ 180/220; 180/68.5; 180/205; 180/207
[58] Field of Search ............... 180/65.3, 65.2, 180/65.1, 65.6, 65.7, 218, 219, 220, 291, 205, 206, 207, 68.5; 280/63, 200, 212, 214

[56] References Cited

U.S. PATENT DOCUMENTS

| | | | |
|---|---|---|---|
| 3,773,131 | 11/1973 | Jaulmes | 180/34 |
| 4,077,485 | 3/1978 | Bonora et al. | 180/68.5 |
| 4,591,017 | 5/1986 | Enjo et al. | 180/205 |
| 5,749,429 | 5/1998 | Yamauchi et al. | 180/205 |
| 5,758,736 | 6/1998 | Yamauchi | 180/220 |
| 5,789,898 | 8/1998 | Suzuki et al. | 320/2 |
| 5,826,675 | 10/1998 | Yamamoto | 180/220 |
| 5,909,781 | 6/1999 | Yonekawa et al. | 180/206 |
| 5,915,493 | 6/1999 | Nakayama | 180/206 |
| 5,924,511 | 7/1999 | Takata | 180/205 |
| 6,016,882 | 1/2000 | Ishikawa | 180/205 |

FOREIGN PATENT DOCUMENTS

| | | | |
|---|---|---|---|
| 8-058671A | 3/1996 | Japan | 180/205 |
| 9-104381 | 4/1997 | Japan . | |

*Primary Examiner*—Daniel G. DePumpo
*Assistant Examiner*—J. Allen Shriver
*Attorney, Agent, or Firm*—Finnegan, Hnederson, Farabow, Garrett & Dunner, L.L.P.

[57] ABSTRACT

A power assist bicycle includes a front wheel and a rear wheel, a bicycle body frame supporting the front and rear wheels to be rotatable, a saddle mounted to the bicycle body frame on which a rider rides, and a pair of pedals which are operatively connected to each other through a crank shaft, and the bicycle body frame includes a head pipe supporting the front wheel, a main pipe extending obliquely downward in a rearward direction from the head pipe, and a saddle pipe supporting the saddle at an upper end portion thereof in a standing attitude of the bicycle. The main pipe and the saddle pipe have lower end portions which are connected to each other through a power unit so as to define a leg space having substantially a V-shape therebetween through which a leg of the rider moves when getting on or off from the saddle, and a battery unit having a rectangular parallelopiped shape is also arranged so as to be operatively connected to the power unit at a lowest position of the V-shaped leg space so as to extend in a horizontal direction of the bicycle.

2 Claims, 2 Drawing Sheets

POWER ASSIST BICYCLE

BACKGROUND OF THE INVENTION

1. Field of the Invention

The present invention relates to a power assist bicycle in which a power unit accommodated with an electric motor is mounted to a bicycle body so that the power assist bicycle can easily run along an upward slope or against a head wind with an assisted pedal leg-power by the assistance of drive power outputted from the electric motor.

2. Description of the Related Art

For a power assist bicycle of this kind, it is necessary to mount a battery unit as a power source to a bicycle body together with a power unit. In such a structure, however, according to the mounting position of the battery unit generally having a large weight, the center of gravity of the bicycle body may be made high or the mass of the body (positions of the heavy parts) may be dispersed, which may result in that a steering stability of the bicycle is made worse or easy conveyance thereof is made worse. For this reason, it will be better in design to arrange the battery unit in the vicinity of the power unit.

In conventional arrangements of the battery unit of a power assist bicycle, the battery unit is arranged, in the vicinity of the power unit, along an upper edge of a main pipe (i.e., a big pipe extending obliquely rearward in a downward direction from a head pipe) of a bicycle body frame or along a rear edge of a saddle (seat) pipe.

Such arrangements, however, have created a number of problems or disadvantages.

In an arrangement where the battery unit is disposed along the upper edge of the main pipe, the battery unit is positioned at a portion in the front side of a V-shaped leg space (i.e., a space through which a leg of a rider moves when getting on or off the bicycle (saddle) formed between the main pipe and the saddle pipe. According to this arrangement, when a rider rides on a saddle or gets off therefrom, it is necessary for the rider to ride over both the main pipe and the battery unit, thus being inconvenient.

In another arrangement, the battery unit is disposed along the rear edge of the saddle pipe. Although inconvenience caused in the above arrangement can be reduced, the structure near the rear wheel will be made complicated. In addition, the saddle obstructs the mounting structure of the battery unit. Moreover, the center of gravity of the bicycle is moved rearward, so that a stable steering stability cannot be accurately ensured, thereby providing additional problems or drawbacks in this arrangement.

SUMMARY OF THE INVENTION

An object of the present invention is to substantially eliminate the problems, disadvantages or inconveniences encountered in the prior art mentioned above and to provide a power assist bicycle having an improved structure in which a battery unit is positioned near the power unit to make lower the center of gravity of the bicycle body and concentrate the mass thereof to improve the steering stability in addition to improving get-on and -off performance of a rider and to improve the mounting of the battery unit.

Another object is to provide a power assist bicycle having a structure capable of effectively utilizing a space near the location of the power unit and the battery unit to make compact the arrangement of the elements or parts of the bicycle and to lower the center of gravity thereof.

These and other objects of the present invention can be achieved by providing a power assist bicycle which comprises a front and a rear wheels, a bicycle body frame supporting the front and rear wheels to be rotatable, a saddle mounted to the bicycle body frame on which a rider rides, and a pair of pedals (cranks) which are operatively connected to each other through a crank shaft, the bicycle body frame including a head pipe supporting the front wheel, a main pipe extending obliquely downward in a rearward direction from the head pipe, and a saddle pipe supporting the saddle at an upper end portion thereof in a standing attitude of the bicycle, wherein lower end portions of the main pipe and the saddle pipe are connected through a power unit so as to define a leg space having substantially a V-shape therebetween through which a leg of the rider moves when getting on or off from the saddle, and a battery unit having a rectangular parallelopiped shape and operatively connected to the power unit is disposed at a lowest position of the V-shaped leg space so as to extend in a horizontal direction of the bicycle.

In a preferred arrangement, the power unit is disposed between the lower end portions of the main pipe and the saddle pipe so as to incline downward in a forward direction to define a part space between the battery unit and the power unit for disposing an auxiliary part in the part space. The power unit includes an electric motor and the auxiliary part includes a control unit operatively connected to the battery unit to control an electric current of the battery unit to thereby operate the electric motor. The control unit is mounted to the power unit, and the control unit and the power unit are covered by a unit cover, which is formed with a battery holder into which the battery unit is fitted.

A bilateral pair of bridge pipes are disposed so as to horizontally cross between the main pipe and the saddle pipe above the power unit and the battery unit is mounted on the bridge pipes. The battery unit is arranged horizontally to be substantially parallel to the bridge pipes and fixed to the main pipe and the saddle pipe to be detachable.

The power unit is supported by the body frame on at least three suspension points so that the crank shaft is disposed inside a triangular portion formed by connecting the three suspension points as viewed from a side of the frame body.

According to the structures of the power assist bicycle of the present invention, since the rectangular battery unit is disposed horizontally to the lowermost position of the V-shaped leg space, the structure can be made compact and the center of the gravity of the body frame can be concentrated without adversely affecting on the getting on and off movement of the rider.

The forward inclining arrangement of the power unit defines the part space between it and the battery unit arranged above the power unit, so that the space can be effectively utilized in addition to the advantageous effects mentioned above.

Furthermore, the location of the bridge pipes can enhance the rigidity of the body frame, and this can be increased by supporting the power unit at at least three suspension points, and the arrangement of the crank shaft in the triangular shape of these three suspension points makes further increase the rigidity and prevents the stress from concentrating to the body frame due to the pedalling leg power.

The nature and further characteristic features of the present invention will be made more clear from the following descriptions made with reference to the accompanying drawings. dr

DESCRIPTION OF THE PREFERRED EMBODIMENT

The present invention will be described hereunder with reference to FIGS. 1 to 3.

Figure 1:
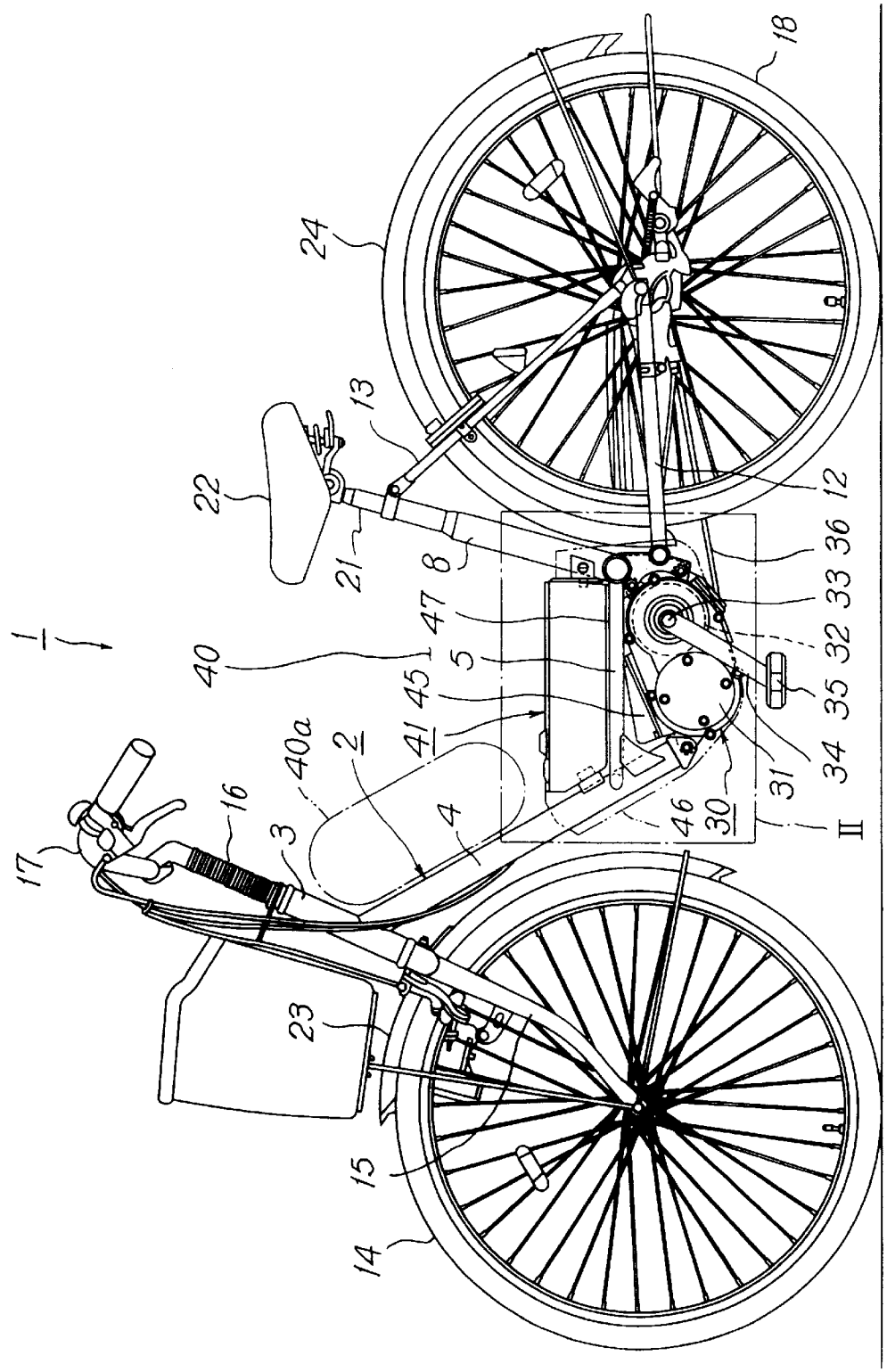
FIG. 1 is a side view of a power assist bicycle according to the present invention.
Figure 2:
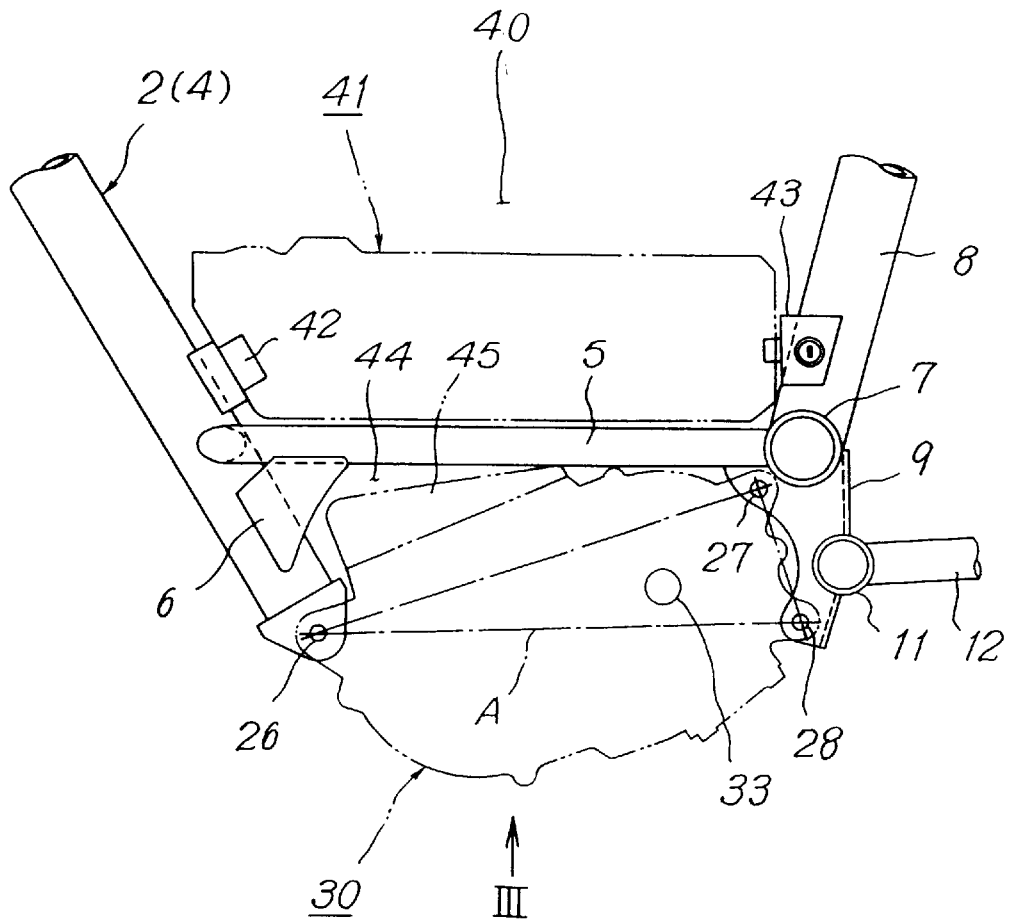
FIG. 2 is a side view of a portion II (FIG. 1) of a bicycle body frame in an enlarged scale according to an embodiment of the present invention.
Figure 3:
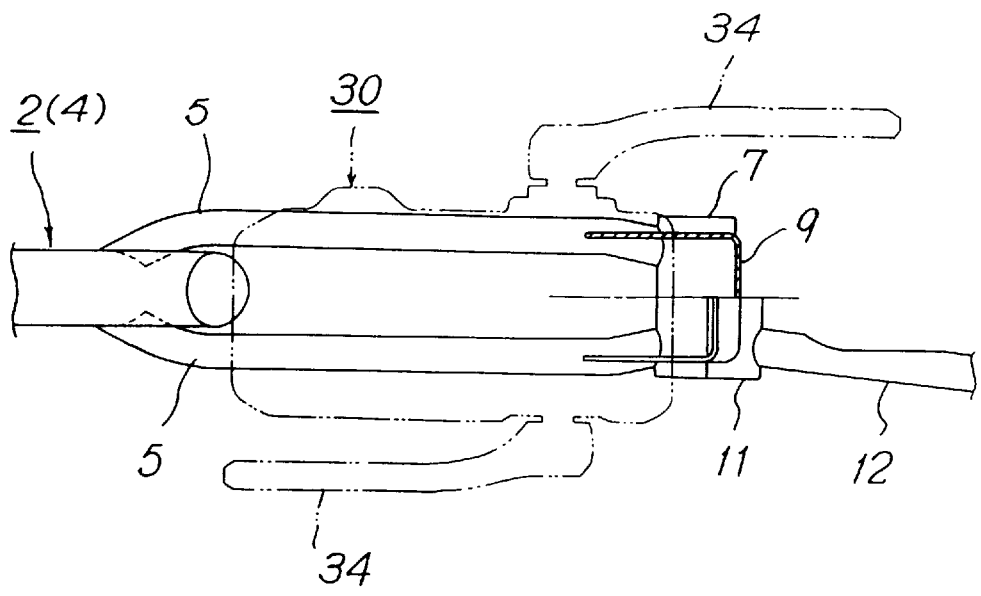
FIG. 3 is a plan view viewed in a direction of III in FIG. 2.

Referring to FIGS. 1–3, a power assist bicycle 1 of the present invention has a body frame 2, which has a structure, for example, in which a big main pipe 4 extending obliquely downward in a rearward direction is fixed to a head pipe 3 which is located to a front portion of the bicycle 1, and front end portions of a bilateral pair of horizontal bridge pipes 5 are connected to the main pipe 4 at a portion slightly upper from the lower end portion so as to extend rearward. Reference numeral 6 denotes a reinforcing member for reinforcing this connection.

Rear end portions of the bridge pipes 5 are connected to a center pipe 7 having a short length to which a saddle (seat) pipe 8 is fixed so as to extend upward therefrom. A center bracket 9 is fixed to the rear end portions of the bridge pipes 5 and the center pipe 7 so as to extend downward therefrom, and the center bracket 9 is made from a plate member and is substantially U-shaped in its plan view as shown in FIG. 3.

A cross pipe 11 having a short length and extending in a width direction of the bicycle body is fixed to a rear central portion of the center bracket 9 and a bilateral pair of chain stays 12 are connected to the cross pipe 11 so as to extend rearward. Furthermore, a bilateral pair of saddle (seat) stays 13 are connected to the upper end of the saddle pipe 8 so as to extend rearward in an obliquely downward direction.

The bridge pipes 5 each constitute a bridge member, which is formed from round pipes each having a circular or like cross section in a preferred embodiment. However, it may be formed from a material having another cross section as far as it has a strength equal to or more than that of the round pipe. Although, in the present embodiment, a bilateral pair of pipes each having a small diameter are provided, one pipe having a relatively large diameter may be provided in place of them.

A front fork 15 supporting a front wheel 14 is mounted to the head pipe 3 to be rotatable and the front fork 15 has an upper portion to which a handle lever 17 is mounted through a handle post 16 to be also integrally rotatable. On the other hand, a rear wheel 18 is supported by coupling portions of the saddle stays 13 and the chain stays 12 on both the bilateral sides thereof. A saddle 22 is mounted to the upper portion of the saddle pipe 8 through a saddle post 21. In FIG. 1, reference numeral 23 denotes a front fender and reference numeral 24 denotes a rear fender.

A front suspension 26 is provided for the lower end of the main pipe 4 and upper and lower rear suspensions 27 and 28 are provided for the center bracket 9, and a power unit 30 is fastened to these suspensions 26, 27 and 28 by means of bolts. That is, the lower end of the main pipe 4 and the lower end of the saddle pipe 5 are connected by the power unit 30 and the two bridge pipes 5 disposed above the power unit 30, and thus, the power unit 30 also functions as a reinforcing member for the bicycle body frame 2.

In the power unit 30, there is accommodated an electric motor 31 and a power combining unit 32 which generates a power in combination of motor driving power and pedaling leg power. A crank shaft 33 is supported so as to penetrate the power unit 30 in the body width direction and a bilateral pair of cranks are fixed to both ends of the crank shaft 33 to be integrally rotatable. Pedals 35 are fixed to the front end portions of the cranks 34 respectively to be rotatable.

A drive sprocket, not shown, is supported by crank shaft 33 at a right side portion of the power unit 30, and a driven sprocket, also not shown, is disposed on the right side of the rear wheel 18. A drive chain or drive belt is engaged around these drive and driven sprockets.

As shown in FIG. 2, three suspensions 26, 27 and 28 provided for the body frame 2 are positioned so as to provide a triangular shape A, as viewed from a side portion, in which the crank shaft 33 is positioned. Further, it is to be noted that, in a case where four suspensions may be located so as to provide a rectangular shape, the crank shaft 33 will be positioned in this rectangular shape.

The main pipe 4, the bridge pipes 5 and the saddle pipe 8 of the body frame 2 constitutes, together with the power unit 30, a leg space 40 having substantially V-shape in front of the saddle 22. The leg space 40 is a space through which a leg of a rider moves when getting on or off from the saddle 22, and a battery unit 41 as a power source of the motor 31 is located at the upper portion of the bridge pipes 5, i.e. the lowest position of the leg space 40.

The battery unit 41 has, for example, a rectangular parallelopiped shape, which is arranged horizontally in parallel to the bridge pipes 5 and fixed to the body frame 2 to be detachably by means of an engaging member 42 attached to the main pipe 4 and a locking mechanism 43 mounted to the saddle pipe 8 in a manner such that the battery unit 41 is removed in the upward direction by releasing the locking mechanism 43 by using a private key.

The power unit 30 is mounted to be slightly inclined in the forward direction. A wedge-shaped parts space 44 is defined between the power unit 30, the battery unit 41 and the bridge pipes 5, and a control unit 45 is mounted in this space 44. The control unit 45 is accommodated with a computer means, such as a micrcomputer, for controlling the power of the electric motor 31 and is fixed to the upper surface of the power unit 30. The control unit 45 may be fixed to the bridge pipes 5. The control unit 45 constitutes an assist part, and a relay, a charge unit, or the like other than the control unit may be also arranged in this parts space 44 as a auxiliary part.

The power unit 30 and the control unit 45 are covered by a unit cover 46, as shown in FIG. 1, formed of a synthetic resin or the like material to make clear an outer appearance. A battery holder 47 is arranged to the upper edge portion of the unit cover 46 so that the battery unit 41 is tightly fitted to the battery holder 47.

When the power assist bicycle 1 of the present invention of the structure mentioned above is run, the crank shaft 33 of the power unit 30 is driven forward, in an advancing direction, by a pedalling leg power of a rider sitting on the saddle 22. At the same time, the control unit 45 controls the current of the battery unit 41 to thereby operate the motor 31 so that the assist driving power is outputted from the motor 31 having a magnitude corresponding to the pedaling leg power applied to the crank shaft 33.

These pedaling leg power and the assist driving power are composed by the power combining unit 32 and the combined force is transferred to the rear wheel 8 through the drive chain 36, and the power assist bicycle 1 is thus run. The control unit 45 controls a current to be applied to the motor 31 to keep the ratio of the pedaling leg power to the assist drive power always constant, for example, 1:1.

As mentioned above, according to the power assist bicycle of the present invention, since the pedaling leg power is assisted with the constant ratio by the assist drive power generated by the motor 31, the power assist bicycle could be very easily run at the time of starting or running along an upward slope, or against a head wind.

When the rider gets on or off from the saddle, the leg of the rider moves through the leg space 40 of the body frame 2. In this viewpoint, according to the power assist bicycle 1 of the present invention, since the rectangular battery unit 41 is located horizontally to the lowest portion of the leg space 40, the get-on and -off availability can be remarkably improved in comparison with the conventional arrangement in which the battery unit is arranged along the main pipe. That is, in the arrangement of the present invention, the battery unit 41 is not disposed in a front space area 40a of the leg space 40 in FIG. 1, through which the leg of the rider often moves, so that the leg of the rider moves only over the main pipe 4.

Furthermore, since the battery unit 41 is disposed in the vicinity (e.g., directly above) of power unit 30, the center of gravity of the bicycle body is lowered and the mass of the body is concentrated, improving the steering stability. Since the battery unit 41 is arranged in the horizontal direction, it can be easily mounted or dismounted.

Still furthermore, since the auxiliary parts, such as control unit 45, are arranged in the wedge-shaped space 44 defined between the battery unit 41 and the power unit 30 inclining forward, a space near the power unit 30 and the battery unit 41 can be effectively utilized, thus making compact and simple the arrangement of the parts, which further contributes the low center of gravity.

Still furthermore, since the bridge pipes 5 are arranged between the main pipe 4 and the saddle pipe 8, the rigidity of the body frame 2 can be far improved, and since the battery unit 41 is disposed above the bridge pipes 5, at a portion of which rigidity is strengthened, the sitting stability can be improved. This arrangement will obviate a trouble of defective contact of a contact.

Still furthermore, since the power unit 30 is supported at three points by three suspensions 26, 27 and 28 to the body frame 2 and the crank shaft 33 is disposed, in the side view, inside the triangular portion A formed by connecting these three points, multi-directional moment applied to the crank shaft 33 of the power unit 30 due to the pedalling leg power can be born uniformly by these three points and transmitted to the body frame 2. For this reason, the concentration of the stress can be effectively prevented and the useful life of the body frame 2 can be increased.

It is to be noted that the present invention is not limited to the described embodiment and many other changes and modifications may be made without departing from the appended claims together with many advantageous effects attained thereby.

What is claimed is:

1. A power assisted bicycle comprising:

a front wheel and a rear wheel;

a bicycle body frame supporting the front and rear wheels to be rotatable;

a saddle mounted to the bicycle body frame on which a rider rides;

a pair of pedals operatively connected to each other through a crank shaft, said bicycle body frame including a head pipe supporting the front wheel, a main pipe extending obliquely downward in a rearward direction from the head pipe, and a saddle pipe supporting the saddle at an upper end portion thereof in a standing attitude of the bicycle; and a bilateral pair of bridge pipes disposed so as to horizontally cross between the main pipe and the saddle pipe above a power unit and a battery unit mounted above the bridge pipes, wherein lower end portions of the main pipe and the saddle pipe are connected through a power unit so as to define a leg space having substantially a V-shape therebetween through which a leg of the rider moves when getting on or off the saddle, the battery unit has a rectangular parallelopiped shape, is operatively connected to the power unit and is disposed at a lowest position of the V-shaped leg space so as to extend in a horizontal direction of the bicycle, and said battery unit is arranged horizontally so as to be substantially parallel to the bridge pipes and detachably fixed to the main pipe and the saddle pipe.

2. A power assist bicycle according to claim 1, wherein said power unit is disposed between the lower end portions of the main pipe and the saddle pipe so as to incline downward in a forward direction to define a part space between the battery unit and the power unit for disposing an auxiliary part in the part space, said power unit includes an electric motor and said auxiliary part includes a control unit operatively connected to the battery unit to control an electric current of the battery unit to thereby operate the electric motor, and said control unit is mounted to the power unit, and the control unit and the power unit are covered by a unit cover, which is formed with a battery holder into which the battery unit is fitted.

* * * * *